Nov. 14, 1961 A. B. HAMMITT ET AL 3,008,368
ADJUSTING DEVICE
Filed Oct. 10, 1956 2 Sheets-Sheet 1

INVENTORS
Andrew B. Hammitt
BY Herbert L. Birum, Jr.
Albert Sperry
ATTORNEY

Nov. 14, 1961 A. B. HAMMITT ET AL 3,008,368
ADJUSTING DEVICE
Filed Oct. 10, 1956 2 Sheets-Sheet 2
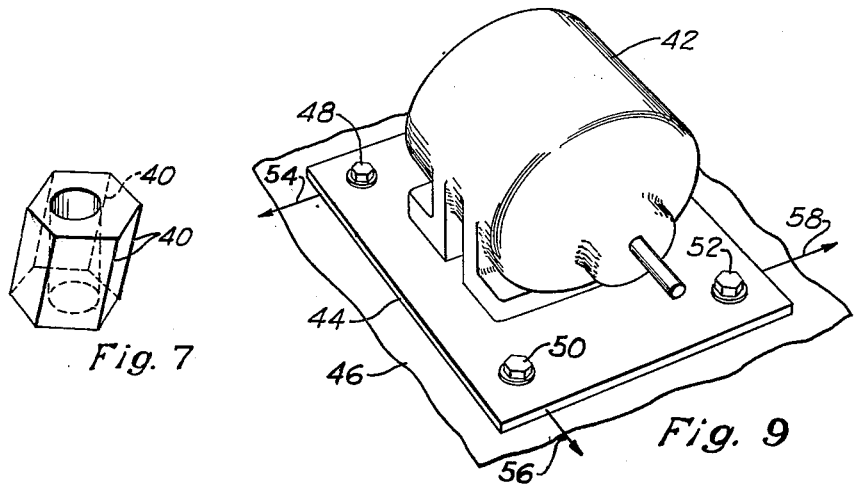
Fig. 7
Fig. 9
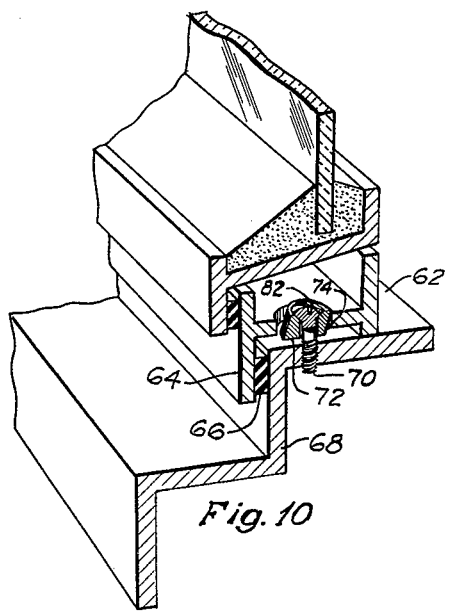
Fig. 10
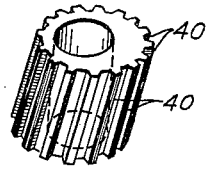
Fig. 8
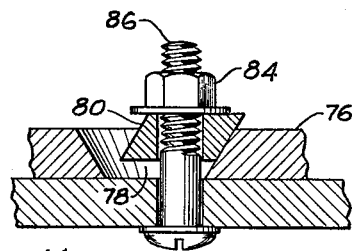
Fig. 11
INVENTORS
Andrew B. Hammitt
BY Herbert L. Birum, Jr.
Albert Sperry
ATTORNEY United States Patent Office 3,008,368
Patented Nov. 14, 1961

3,008,368
ADJUSTING DEVICE
Andrew B. Hammitt, 909 W. State St., Trenton, N.J., and Herbert L. Birum, Jr., Pleasant Valley Road, Titusville, N.J.
Filed Oct. 10, 1956, Ser. No. 615,149
5 Claims. (Cl. 85—1)

This invention relates to a new type of device adapted to be applied to a fastener and to engage another member to exert a laterally directed force on the member to adjust the position of the member or to draw members together when the fastener is tightened against the device.

There are many situations wherein it is desirable to secure a member accurately in place by means of fasteners. However, the bolt holes or other openings in the member to be adjusted generally have to be elongated to provide for the desired adjustment and, in any event, the holes are not always positioned accurately. Furthermore, it is sometimes desirable to adjust the position of the member as it is being secured in place, whereas prior constructions have generally made it necessary to adjust the member before it is bolted down or secured in position or have required loosening of the securing means in order to effect any adjustment. In other installations it may be desirable to draw members together, as when compressing a gasket or sealing member, although the structure does not present means or access which render it possible to apply fasteners in a manner to exert the necessary clamping or compressing forces.

In accordance with the present invention a novel type of device is provided which can be applied to a fastener for the purpose of urging a member laterally with respect to the fastener as the fastener is being applied. In this way the adjusting and the securing of the member can be accomplished simultaneously and members can be drawn together by fasteners extending at right angles thereto. The devices of the present invention preferably have a generally cylindrical or prism-shaped body with the sides of the body being inclined with respect to the end faces thereof. The body further has a bore extending through the body from one end face to the other. Such devices are simple and economical to produce and can be made from substantially any bar or tube stock and may be used in combination with any conventional type of headed fastener such as a bolt, screw, nail, rivet, or the like.

In the preferred form of the invention the device consists of a cylindrical or prism-shaped sleeve having a flat end face adapted to be engaged by a fastener and having a thrust surface or side which is inclined with respect to the end face and with respect to the axis of a fastener extending through the sleeve.

When a sleeve of this type is applied to a fastener and inserted into an opening in the member to be secured or adjusted in place, the action of the fastener in forcing the sleeve into the opening serves to urge the inclined thrust surface or side of the sleeve against one side of the opening so as to apply a laterally directed force to the member for adjusting its position or for drawing it toward another member.

The principal object of the present invention is to simplify the operation of adjusting or clamping a member when securing the same in place.

Another object of the invention is to provide a new type of device adapted to be applied to a fastener for exerting a laterally directed force to a member being secured in place.

A specific object of the invention is to provide a device in the form of a cylindrical or prism-shaped sleeve adapted to be applied to a fastener and having a flat end face engageable by a fastener together with a side wall or thrust surface which is inclined with respect to the end face and with respect to the axis of a fastener extending through the sleeve.

Another object of the invention is to provide a new type of adjusting or clamping device adapted to be made from bar or tube stock.

These and other objects and features of the present invention will appear from the following description thereof wherein reference is made to the figures of the accompanying drawings.

In the drawings:

FIGS. 4 to 8 illustrate typical alternative forms of sleeve embodying the present invention;

FIG. 9 is a perspective showing a typical application of the present invention wherein it may be used in adjusting the position of a member;

FIG. 10 is a view partly in section illustrating a typical application of the invention as used for clamping or compressing members; and FIG. 11 illustrates a construction embodying the present invention wherein a member being secured or adjusted is provided with a fastener receiving opening having an inclined surface.

Figure 1:
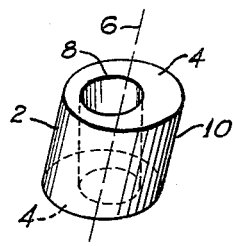
FIG. 1 is a perspective illustrating one typical form of device embodying the present invention.
Figure 2:
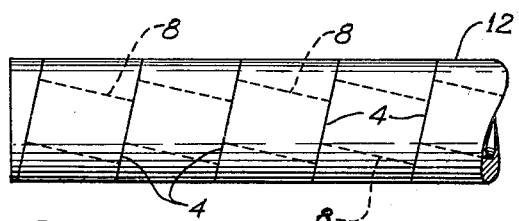
FIG. 2 is an illustration of a piece of bar stock showing a preferred method of producing devices of the type shown in FIG. 1.
Figure 3:
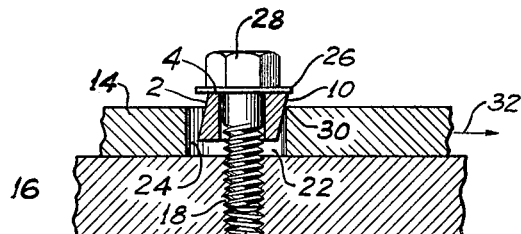
FIG. 3 is a sectional view through a typical assembly embodying the device of FIG. 1.

In that form of the invention chosen for purposes of illustration in FIGS. 1, 2 and 3, the device is shown as having a body 2 which may be formed from a short section of cylindrical bar stock such as steel, aluminum or other metal. The opposite end faces 4 of the body are flat and preferably parallel and are inclined with respect to the axis 6 of the body. A fastener receiving bore 8 passes through the body 2 at right angles to the end faces 4 with the result that the side walls 10 of the body constitute thrust surfaces which are inclined with respect to the bore 8 and with respect to the end faces 4.

A device of this type can be readily produced as shown in FIG. 2 by cutting a metal bar 12 obliquely into short lengths after which each length may be drilled in a direction at right angles to the faces 4 to form the fastener receiving bore 8.

The device illustrated in FIG. 1 may be employed as shown in FIG. 3 for securing a member 14 to an element 16 in an adjusted position with respect thereto. For this purpose the device 2 is applied to a fastener 18 adapted to be threaded into an opening 20 in the element 16. The assembled fastener and device are then inserted into a larger opening 22 in the member 14 and the device 2 is positioned so as to cause the inclined thrust surface 10 thereof to bear against the side of the opening 22 against which force is to be exerted in moving the member 14 to its adjusted position.

The opening 22 in the member 14 is of sufficient diameter or size to provide adequate clearance at the point 24 between the lower projecting edge of the device and the adjacent side of the opening to allow the member 14 to be displaced laterally without resulting in engagement of the lower edge of the device with the side of the opening. For this purpose the opening 22 may be of elongated form. However it is generally easier and more economical to provide a circular opening of a diameter substantially exceeding the longest dimension of the lower end face 4 of the device.

The fastener is preferably provided with a washer 26 which overlies the device beneath the head 28 of the fastener whereby any tendency for the device to rotate within the opening 22 as the fastener is turned down is reduced by reason of slippage which may occur between the head of the fastener and the washer, and between the washer and the device. If desired the washer 26 may be of sufficient size to completely cover the opening 22 in the member 14 when the fastener is fully turned down into place. However, this is not necessary, and in fact, it is not necessary to use any washer at all.

In any event, when the fastener 18 is tightened so that its head 28 (or the washer 26) presses against the flat upper end 4 of the device, the device is forced into the opening 22 in member 14. The inclined thrust surface 10 of the device is then pressed forcibly against the side of the opening 22 and the point of contact 30 on the inclined thrust surface is displaced laterally with respect to the axis of the fastener as the device is moved into the opening. The thrust surface therefore exerts a laterally directed force on member 14 as represented by the arrow 32 and serves to move the member to the right as seen in FIG. 3.

When using a device of the type shown in FIG. 1, lateral movement of the device itself with respect to the fastener is prevented by the shank of the fastener since the bore 8 through which the shank of the fastener extends is but little larger in diameter than the shank itself. As a result, tilting of the device within the opening 22 is prevented when the fastener is tightened.

The size of the fastener receiving bore in the device can be varied to permit the device to be applied to any type of fastener such as a bolt, screw, nail or rivet without specially fitting or forming the device for application to any particular fastener. The device is thus universally applicable to fastening means and but a very limited number of sizes of the device need be provided to insure application thereof in any location and with any fastener.

The devices of the present invention may take any of various forms and the particular shape and style thereof may be adapted to meet substantially any conditions encountered. Nevertheless, in general they are cylindrical or prism-shaped and have a bore extending therethrough from one end face to the other, whereas the sides of the body are inclined with respect to the end faces of the body and preferably also with respect to the axis of the bore.

Figure 4:
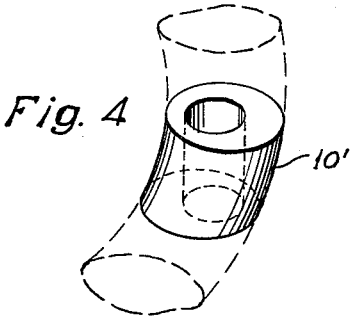

As shown in FIG. 4 the bar stock may be curved or bent before severing lengths therefrom whereby the thrust surface 10' may have an arcuate or curved form. With this form of device, the amount of lateral thrust exerted may be varied as the fastener is tightened to effect greater lateral displacement of the member being secured during the initial stages of tightening the fastener than during the final phase of the tightening operation.

Figure 5:
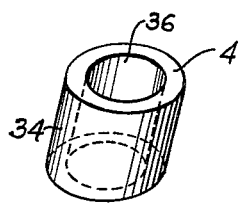

As shown in FIG. 5, the bar stock used may consist of a metal tube which when cut obliquely into a short length results in the formation of a sleeve 34 wherein the bore 36 extends parallel to the side walls or thrust surfaces 10 of the sleeve. The tube, as in the construction of FIG. 1, has a flat end face 4 inclined with respect to the axis of the tubular stock from which the sleeve is made.

Figure 6:
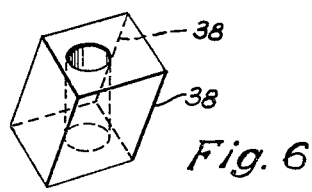

The form of device shown in FIG. 6 may be produced from bar stock which is rectangular in cross section. The resulting prism-shaped device is particularly useful where the device tends to rotate within an opening in the member to be fastened. The corners 38 of the body then tend to cut into the sides of a round opening so as to prevent rotation of the device and, of course, if the opening in the body is square or rectangular, the sides and corners of the body will positively prevent rotation of the device under any conditions of use.

In a similar way the body of the device may be polygonal in cross section. As shown in FIG. 7, the body is hexagonal and as shown in FIG. 8, it may present a circumferentially irregular, fluted or serrated surface presenting several smooth axially extending thrust surfaces 40 which permit the necessary longitudinal movement of the body by the fastener for the purpose of exerting the desired lateral thrust while preventing rotation or circumferential displacement of the device during the tightening operation or when in use.

The devices of the present invention may be employed for adjusting the position of a member while securing it in place. Thus, as shown in FIG. 9, a motor 42 having a base 44 may be secured to the support 46 by bolts 48, 50 and 52. Sleeves such as that shown in FIG. 1 are applied to each bolt and extend into openings in the base 44. The sleeve applied to the bolt 48 may be positioned to exert a lateral thrust to the base 44 in the direction indicated by the arrow 54 upon tightening of the bolt 48. In a similar way the sleeves applied to the bolts 50 and 52 may exert lateral thrusts on the base in the direction of the arrows 56 and 58. By suitably tightening each bolt the position of the base may be adjusted so that the shaft 60 of the motor will be properly aligned with equipment to be driven thereby.

If desired all of the sleeves on the bolts may be inclined in the same direction so that when the bolts are tightened the whole motor will be displaced laterally to a desired position. In the alternative, the bolts 50 and 52 at the front of the motor may be inclined in one direction while those at the rear of the motor are inclined in the opposite direction. The motor can thus be turned slightly as it is being secured in place to insure proper adjustment in the position thereof. The sleeves further may be positioned so as to apply equal outwardly radiating thrust forces to the base to afford increased stability to the motor in order to overcome vibration or insure the most rigid mounting of the motor on its support.

In this way accurate adjustment in the positioning of members can be effected during the operation of securing the member in place. In the case of the motor illustrated in FIG. 9, the position of the motor can actually be varied while the motor is in use and without loosening any elements of the assembly. The mere tightening of one or more of the attaching bolts will effect the desired adjustment with a minimum of difficulty and danger and with the greatest of accuracy.

The construction of FIG. 9 further serves to illustrate the fact that devices of the present invention can be rotated to any position and through 360 degrees of rotation within an opening in order to exert a thrust force in any desired direction with respect to the fastener. The devices can be suitably positioned and varied so as to exert the desired thrust at any point and in any direction to oppose external forces or to insure a balanced relation of one member with respect to another.

The assembly of FIG. 10 is typical of those applications wherein the devices of the present invention are employed for drawing members together. In such an assembly the sill 62 of a window frame is provided with an outer flange 64 having a sealing element or caulking material 66 located between the flange and the exterior of a building member 68 to provide a weather-tight construction. However, the assembly does not afford any location for the placement of bolts or other usual fastening means for forcing the frame inward in a conventional manner to compress the sealing means 66 to insure a tight assembly. Nevertheless, the devices of the present invention can be used in combination with bolts 70 passing through openings in the sill 62 so as to extend vertically downward into the building member 68 at right angles to the direction in which the frame must be moved to compress the sealing means. For this purpose, the sleeves 72 are applied to the bolts 70 and are positioned so that the thrust surface 74 thereof will engage the inner side of the opening in the sill 62 to urge the frame inward. Tightening of bolt 70 in a direction radially with respect to the window opening then serves to draw the frame inward due to the inwardly directed thrust action of the sleeve with respect to the frame. In this way the sealing material 66 is compressed and urged firmly into place to afford a weather-tight assembly. Moreover, if the surfaces of the flange 64 and the member 68 are not exactly parallel the thrust exerted by the device 72 at one point along the sill can be suitably increased or decreased by turning one fastener down farther than another or by varying the positions of the fasteners within the openings in the sill so as to draw the frame inward at one point more forcibly than at another. In this way it is possible to insure the desired compression of the sealing means at all points throughout the length thereof.

The devices of the present invention can thus be used to enable fasteners to be applied in inaccessible locations for the purpose of drawing members together in a direction at right angles to that in which the fasteners are applied. The devices also can be used in a great variety of alternative ways to accomplish results which could not be attained heretofore or which have required the use of additional and frequently complicated elements.

In all applications of the device the opening in the member which is engaged should be of sufficient size or diameter to prevent engagement of the lowermost edge of the device, at the side thereof opposite to the thrust surface, with the adjacent side of the opening. Only the thrust surface of the device need engage the member being secured, adjusted or drawn into place. However, instead of providing a relatively large opening in the member, the opening itself may be inclined. In the alternative, the opening may be formed with sloping side walls as shown in FIG. 11. In such a construction the member 76 is formed with an opening having sloping or countersunk side walls 78 against which the thrust surface of the device 80 may bear throughout its entire length.

The angle of inclination of the side walls or thrust surfaces of the sleeve with respect to the axis of the fastener can be varied greatly but is preferably less than 45°. The inclination of the side walls with respect to the end face engaged by the head of the fastener will, of course, present a corresponding variation from 90°.

The end face of the body against which the head of the fastener bears is preferably flat, although when the device is to be applied to a screw or bolt which presents a conical surface to the end face of the device, the end face may be correspondingly countersunk or formed to receive the bolt as shown at 82 in FIG. 10.

While the head of the fastener may engage the end face of the device it is generally desirable to insert a washer beneath the head of the fastener, and of course, the "head of the fastener" may be a nut carried by a bolt, as shown at 84 and 86 respectively in FIG. 11, since it is immaterial whether the head or a nut or washer is employed for forcing the body of the device into the opening in the member being adjusted or clamped in place.

Hence it will be evident that the particular form, shape and size of the device and the angle of inclination of its side walls can be varied as desired to meet any particular conditions and in applying the device for various uses. Similarly the type of fastener employed can be chosen for any purpose required. The devices are accordingly universal in application and can be produced in any desired way.

In view thereof it should be understood that the particular forms of the device and the methods of producing and using the same which have been described above are intended to be illustrative only and are not intended to limit the scope of the invention.

We claim:

1. A device for application to a fastener comprising a body having end faces, parallel opposite sides which are inclined with respect to said end faces, and a fastener receiving bore extending through the body from one of said end faces to the other.

2. A device for application to a fastener comprising a cylindrical body having flat end faces, a fastener receiving bore extending through the body from one of said end faces to the other, the sides of the cylindrical body being parallel and inclined with respect to the end faces and with respect to said bore.

3. A device for application to a fastener comprising a length of bar stock having the ends of said bar stock inclined with respect to the axis thereof and a fastener receiving opening extending through the bar stock in a direction normal to said ends.

4. A device for application to a fastener comprising a length of bar stock which is circular in cross section, said length having the ends of said bar stock inclined with respect to the axis thereof and a fastener receiving opening extending through the bar stock in a direction normal to said ends.

5. An assembly comprising a headed fastener having a shank and a sleeve surrounding said shank and presenting an end surface engageable by the head of the fastener, the sides of the sleeve being parallel and inclined with respect to the shank of the fastener.

References Cited in the file of this patent
UNITED STATES PATENTS

| | | |
|---|---|---|
| 1,213,599 | Dow | Jan. 23, 1917 |
| 1,328,509 | Ganster | Jan. 20, 1920 |
| 1,332,317 | Boas | Mar. 2, 1920 |
| 1,957,554 | Rector | May 8, 1934 |
| 2,643,573 | Johnson | June 30, 1953 |
| 2,666,354 | Dim | Jan. 19, 1954 |
| 2,690,073 | McLaughlin | Sept. 28, 1954 |